US008207835B2

(12) United States Patent
Schwartz et al.

(10) Patent No.: US 8,207,835 B2
(45) Date of Patent: Jun. 26, 2012

(54) VEHICLE SAFETY DEVICE

(76) Inventors: Micha Schwartz, Boca Raton, FL (US); Sharon Schwartz, Boca Raton, FL (US)

( * ) Notice: Subject to any disclaimer, the term of this patent is extended or adjusted under 35 U.S.C. 154(b) by 250 days.

(21) Appl. No.: 12/509,419

(22) Filed: Jul. 24, 2009

(65) Prior Publication Data
US 2010/0097199 A1 Apr. 22, 2010

Related U.S. Application Data

(60) Provisional application No. 61/106,610, filed on Oct. 19, 2008.

(51) Int. Cl.
*B60Q 1/00* (2006.01)

(52) U.S. Cl. ........... 340/435; 340/438; 340/425.5; 348/148; 359/838; 362/494

(58) Field of Classification Search .......... 340/438, 340/425.5; 348/148; 359/838; 362/494
See application file for complete search history.

(56) References Cited

U.S. PATENT DOCUMENTS

| 5,646,614 | A | 7/1997 | Abersfelder et al. |
| 6,690,268 | B2 * | 2/2004 | Schofield et al. ......... 340/438 |
| 2005/0146603 | A1 | 7/2005 | Cellina et al. |
| 2006/0244829 | A1 | 11/2006 | Kato et al. |
| 2007/0132894 | A1 | 6/2007 | Vitito |

FOREIGN PATENT DOCUMENTS

| EP | 1033693 B1 | 4/2004 |
| WO | WO03091068 A1 | 11/2003 |

* cited by examiner

*Primary Examiner* — Daryl Pope
(74) *Attorney, Agent, or Firm* — John C. Smith

(57) ABSTRACT

A vehicle safety system that provides an improved line of sight for oncoming traffic as the vehicle is backed out of a parking space. A set of rear side looking cameras input video information to a display used by the vehicle driver. The cameras are positioned on the rear side portion of the vehicle and are directed generally to traffic coming from the rear left or right side of the vehicle. The camera is automatically activated when the transmission is placed in reverse. The camera video is input to a driver display that allows the driver to view oncoming traffic before the vehicle backs into the traffic lane. The system can also be used to monitor blind spots when a turn signal is activated prior to a lane change.

16 Claims, 10 Drawing Sheets

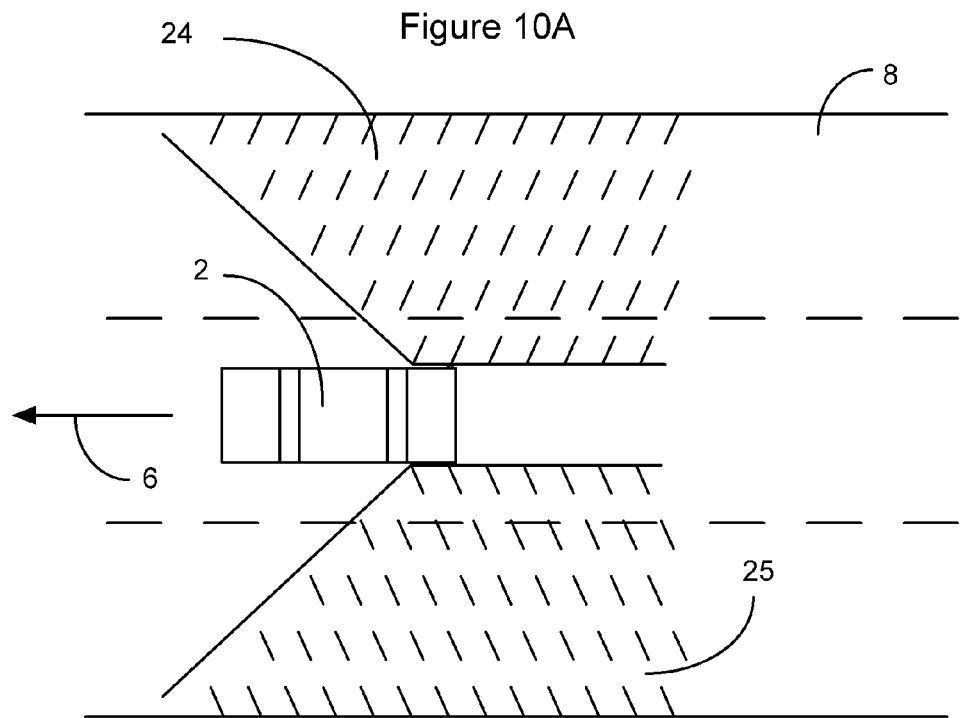
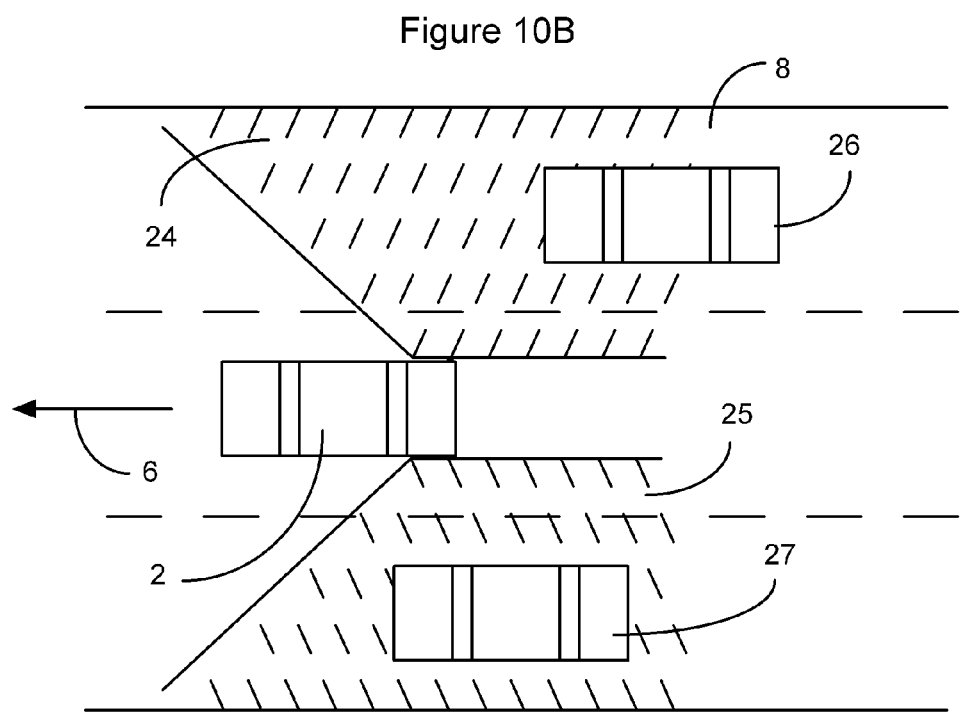

VEHICLE SAFETY DEVICE

CROSS-REFERENCE TO RELATED APPLICATIONS

This application is related to, and claims the benefit of, the provisional patent application entitled "Automobile Safety Device", filed Oct. 19, 2008, bearing U.S. Ser. No. 61/106,610 and naming Micha Schwartz, a named inventor herein, as sole inventor, the contents of which is specifically incorporated by reference herein in its entirety.

BACKGROUND

1. Technical Field

This invention relates in general to automobile safety systems, and more particularly it relates to a video system that automatically or manually activates when the automobile is in reverse to allow the driver to see traffic approaching the rear sides of the vehicle when backing out of a parking space.

2. Background of the Invention

As drivers realize, it is often difficult for them to tell when traffic is coming when they are backing out of a parking space. This is especially true when a vehicle is not parallel parked. When a vehicle is parked perpendicular to the flow of traffic, or at an angle to the flow of traffic, vehicles parked next to the driver's vehicle often block the driver's line of sight. As a result, numerous accidents have occurred because of drivers who have pulled out in front of unseen oncoming traffic. In fact, a high percentage of damage to vehicles originates in parking lots. It would be desirable to have a method of alerting a driver to traffic approaching the rear of the vehicle that is outside of the driver's line of sight before the driver backs out of a parking space.

The prior art has provided video systems that look directly behind the vehicle. This provides a safety feature that allows the driver to know if something is directly behind the vehicle prior to backing up. This can be particularly valuable in a residential setting where children may be at play. However, known vehicle video systems only provide a view directly behind the vehicle. Unfortunately, most accidents in parking lots occur when a vehicle is backing out of a parking slot and is struck by another vehicle that is approaching in a substantially perpendicular angle in the lane behind the parking space. In this situation, rear view video systems are useless because they are aimed in the wrong direction.

While the prior art has provided a variety of devices to improve vehicle safety, it has failed to provide a system that alerts drivers backing out of parking slots about approaching vehicles that are coming from a substantially perpendicular direction to the direction of the vehicle backing out of a parking spot.

SUMMARY OF THE INVENTION

This invention provides a side view video system that generates video information showing any traffic approaching from a substantially perpendicular direction to the parking slot and inputs that video information to a display used by the vehicle driver. The system is positioned on the rear portion of the vehicle and is directed to traffic coming from the left and right sides of the vehicle. The camera system is automatically activated when the transmission is placed in reverse. The camera video data is input to a driver display panel that allows the driver to view traffic approaching from the side of the automobile before the vehicle backs into the traffic lane.

BRIEF DESCRIPTION OF THE DRAWINGS

FIG. 10A illustrates the driver's blind spots when traveling on a multi-lane road.

FIG. 10B illustrates unseen vehicles in the driver's blind spots when traveling on a multi-lane road.

DETAILED DESCRIPTION OF THE PREFERRED EMBODIMENT

Prior to a discussion of the figures, an overview of the invention will be presented. While it is expected that a substantial majority of vehicles using the system will be conventional automobiles, the principles and advantages of the invention can be applied to any motorized vehicle such as trucks, vans, etc. Therefore, throughout the specification, the term vehicle will be used rather than more specific terms such as automobiles, cars, etc. The invention is a safety system that helps a driver avoid accidents when backing out of a parking space. It uses strategically placed cameras on the rear side or end of a vehicle that are connected to a display unit. The cameras are directed laterally on either side of the vehicle such that as the rear end of the vehicle backs out of the parking space into the traffic lane, the camera will display images of traffic approaching either side of the vehicle.

The advantage provided by the invention is that it allows the driver to see oncoming traffic that is approaching the side of the vehicle before the driver pulls the vehicle out in front of that traffic. As a result, the driver can stop the vehicle when traffic is coming in order to avoid an accident.

The display unit can be any suitable device. For example, it can use the displays currently available on many vehicles for navigation systems. Likewise, it can be incorporated into other devices, such as review mirrors. It is also possible to use a standalone monitor that is added to the vehicle for the express purpose of this invention. Those skilled in the art will recognize that pre-existing monitors can be used along with aftermarket monitors.

The cameras can be placed in any convenient location. For example, they can be incorporated in the turn signal assembly such that it is substantially invisible. Likewise, it can be placed in any other suitable location, such as the rear bumper or rear fender of the vehicle. In addition, the cameras can also be located in the center of the vehicle in a convenient location such as on the license plate. The placement of the cameras can be in any convenient location so long as they can observe traffic approaching the vehicle from either side.

Having discussed the invention in general, we turn now to a detailed discussion of the drawings.

Figure 1A:
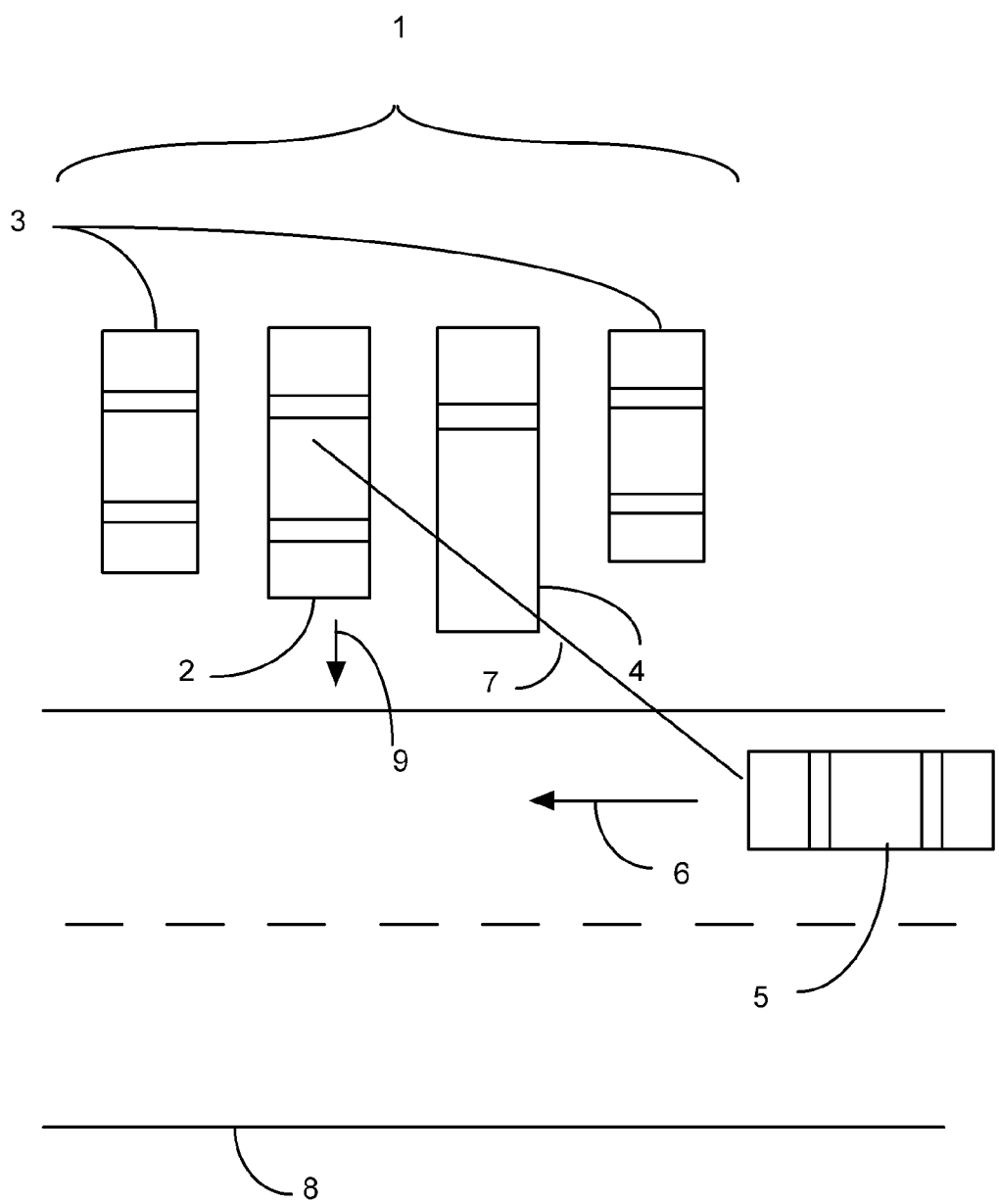
FIG. 1A illustrates the prior art in which a vehicle is parked at an angle to the curb with oncoming traffic in the lane that the vehicle is about to back into.

Regarding FIG. 1A, this figure illustrates the prior art. In this case, a vehicle 2 is parked in a parking area 1 with a number of other passenger vehicles 3 and/or larger vehicles such as trucks or SUVs 4. When the driver of vehicle 2 wishes to depart, vehicle 2 is driven in reverse along direction 9 towards roadway 8.

As can be seen in this figure, if another vehicle 5 is traveling along roadway 8 in direction 6, the truck or SUV 4 will obstruct the driver's line of sight 7. As a result, the driver of vehicle 2 may back out into roadway 8 and have a collision with vehicle 5. This would not happen if the driver of vehicle 2 had been able to see oncoming vehicle 5. Those skilled in the art will recognize that while larger vehicles can block the driver's line of sight, it can also be blocked when smaller vehicles prevent line of sight views due to window darkening materials that are commonly used in warm climates.

Figure 1B:
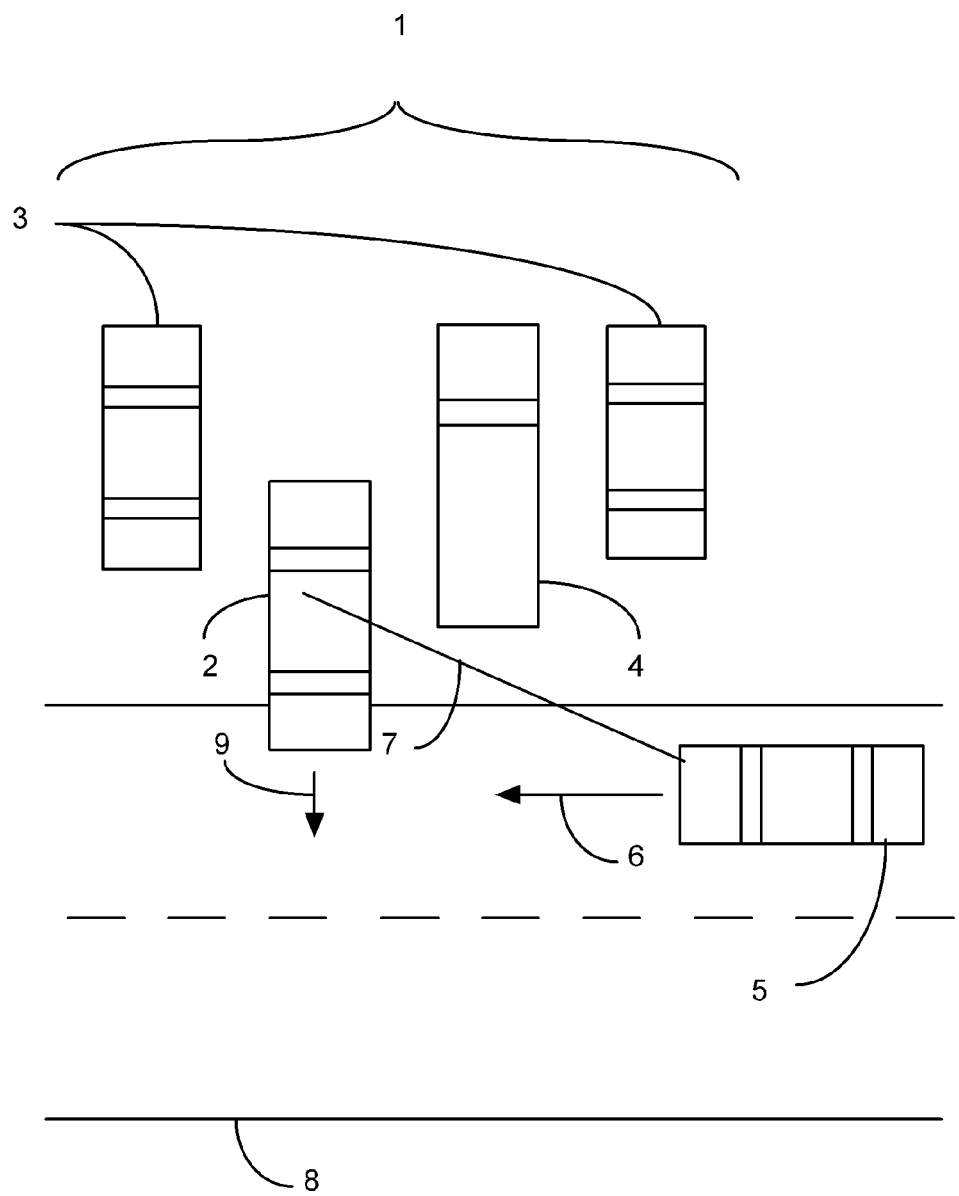
FIG. 1B illustrates the prior art in which a vehicle was parked at an angle to the curb and is backing out into a traffic lane with oncoming traffic.

FIG. 1B illustrates the prior art in which a vehicle 2 was previously parked at an angle to the curb and is now backing out into a roadway 8. This figure illustrates how far the vehicle 2 has to back out into the roadway 8 before the driver of vehicle 2 can see vehicle 5 along the driver's line of sight 7. As can be seen, by the time the driver of vehicle 2 has backed out to the point where vehicle 5 can be seen, vehicle 2 is already in roadway 8 where it may be hit by vehicle 5.

Figure 2:
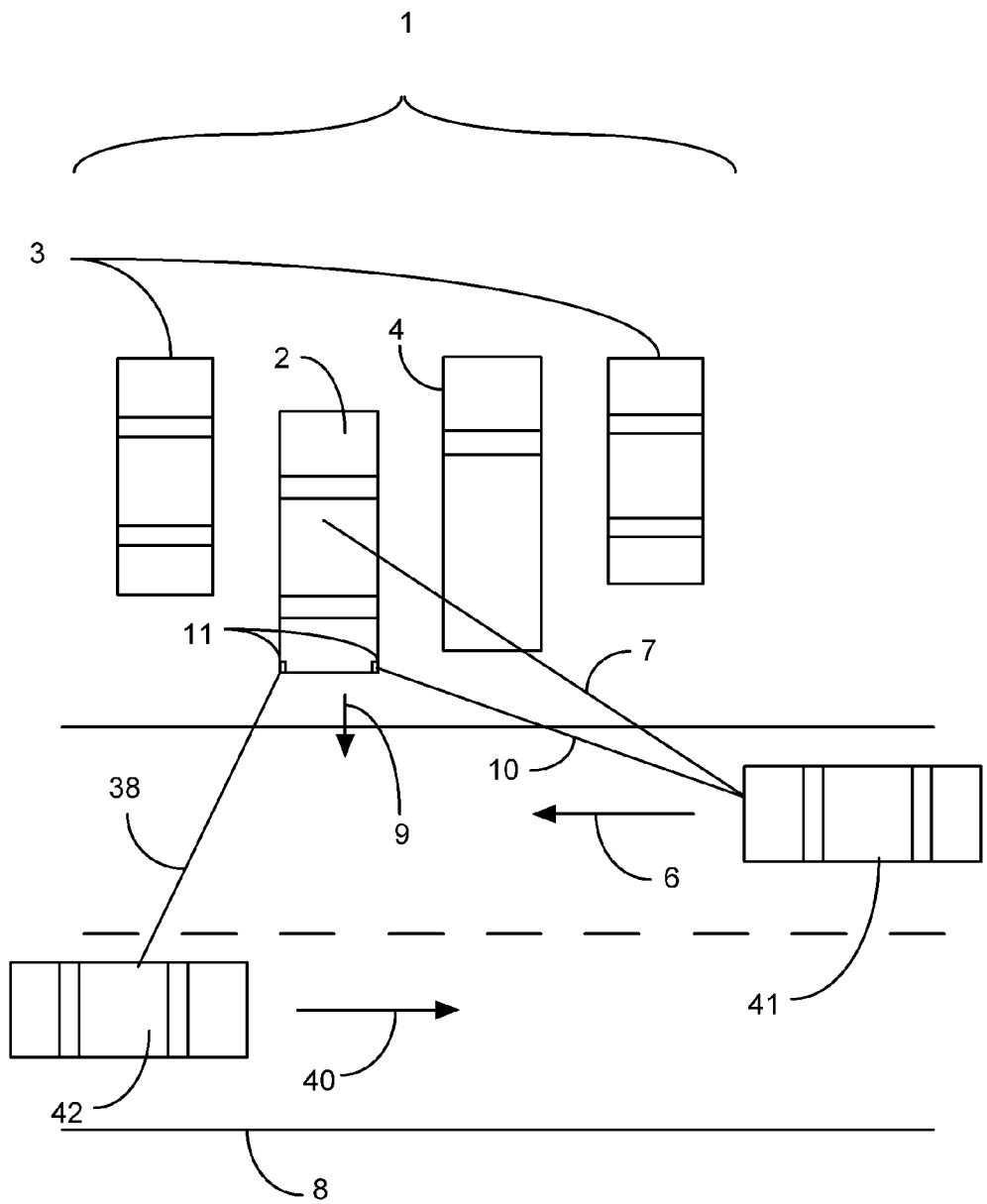
FIG. 2 illustrates a preferred embodiment of the invention in which a vehicle is beginning to back out of a parking space with oncoming traffic approaching the vehicle.

FIG. 2 depicts a preferred embodiment of the invention in which vehicle 2 is equipped with the side viewing cameras 11 that are part of this invention. Side viewing cameras 11 are positioned near the rear side end of the vehicle 2 and are aimed outward from the sides of vehicle 2 in either direction. In this case, the cameras 11 provide a line of sight 10 that detects the oncoming vehicle 41 traveling in direction 6, as well as a line of sight 38 that detects oncoming vehicle 42 traveling in direction 40, before vehicle 2 enters roadway 8. As can also be readily seen from this figure, prior art rearview cameras would be useless in this situation.

The images of oncoming vehicles 41-42, which have been detected by cameras 11, are displayed to the driver on a monitor (shown below in regard to FIG. 3) inside of vehicle 2. Because cameras 11 provides the driver of vehicle 2 with an improved line of sight in both directions, the driver can stop vehicle 2 before it pulls in front of either oncoming vehicle 41-42. As a result, an accident has been avoided.

The cameras 11 have been discussed in terms of a conventional video camera system, but those skilled in the art will recognize that they can also be night vision cameras, infrared cameras, sonar detectors, or radar detectors. Of course, in the case of non-video detection systems, such as radar, an audio alarm or lamp would be used in place of the monitor 12 (discussed below).

Figure 3:
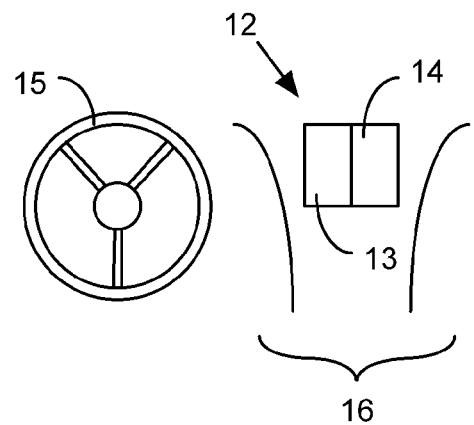
FIG. 3 illustrates a preferred embodiment of the monitor that displays images from the rear side mounted cameras.
Figure 4:
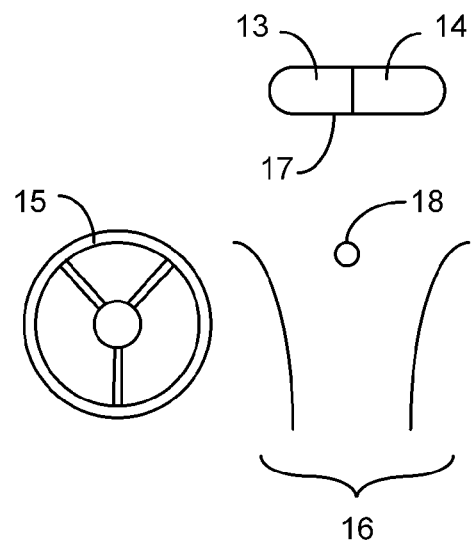
FIG. 4 illustrates an alternative preferred embodiment in which the monitor is integrated into the rearview mirror of the vehicle.

FIG. 3 illustrates the monitor 12 used by the invention to display images captured by cameras 11. Those skilled in the art will recognize that monitor 12 can be placed in any convenient location for the driver's use. For ease of discussion in illustration, monitor 12 is shown mounted to the center console 16 of vehicle 2 next to steering wheel 15. In this figure, monitor 12 is shown as a single screen that is split into display areas 13-14. Each display area 13-14 are associated with a camera 11 such that when the driver is backing the vehicle 2 out of a parking space, monitor 12 will simultaneously show oncoming traffic approaching from both directions In FIG. 4, an alternative preferred embodiment is presented in which the display areas 13, 14 of monitor 12 are incorporated into the rearview mirror 17 of vehicle 2. In the preferred embodiment, the display area 13 will show traffic coming from one side of the vehicle 2, and display area 14 will show traffic coming from the other side of the vehicle 2. Display areas 13, 14 may optionally be separated to make it easier for the driver to distinguish whether oncoming traffic is coming from the left or the right. Those skilled in the art will recognize that an advantage of this embodiment is that it allows older vehicles without console display units could be more easily retrofitted with the invention. The rearview mirrors with display capability are well known in the art and do not need to be further discussed herein. Of coarse, those skilled in the art will recognize that newer vehicles equipped with video display consoles may incorporate the invention using their existing video display console.

Figure 5:
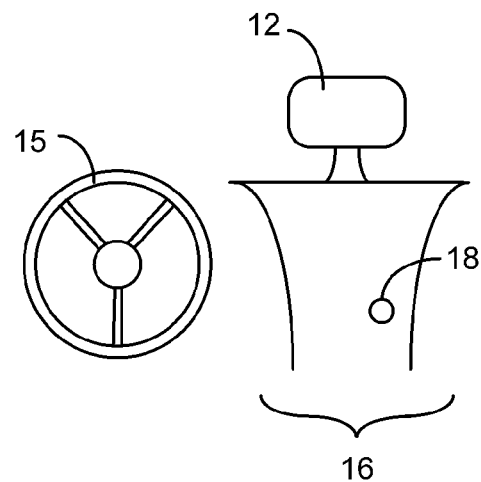
FIG. 5 illustrates an alternative preferred embodiment in which the monitor is a standalone unit mounted in the vehicle.

FIG. 5 illustrates an alternative preferred embodiment in which the monitor 12 is a standalone unit mounted in the vehicle. This embodiment is useful for aftermarket installations in that a minimum amount of effort is required to install the monitor 12.

In the preferred embodiments, the cameras 11 and monitor 12 are automatically activated when the transmission is placed in reverse. As a result, safety information is automatically presented to the driver without requiring any action on the driver's part.

This figure also illustrates optional audible alarm 18. Audible alarm 18 can be placed in any convenient location. For ease of discussion, audible alarm 18 is illustrated as a discrete unit. However, those skilled in the art will recognize that the function of the audible alarm 18 can be implemented using a pre-existing radio or stereo system within a vehicle. Likewise, the alarm 18 does not have to be an audible alarm. For example, it can be a lamp that illuminates or blinks when necessary.

Figure 6:
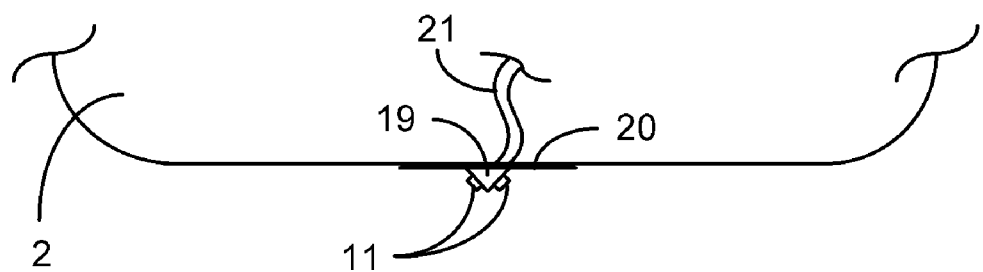
FIG. 6 illustrates a top view of an alternative preferred embodiment in which video system is mounted on the rear of the vehicle.

FIG. 6 illustrates a top view of an alternative preferred embodiment in which video system is mounted on the rear of the vehicle 2. In this view, the cameras 11 are incorporated into a camera support 19 that is in turn part of a mounting bracket 20. In this embodiment, the cameras 11 are pointing to the side of the vehicle 2 such that any other vehicle will be seen as described in the foregoing embodiments. An advantage of this embodiment is that it can be easily attached to a vehicle as an aftermarket accessory. In particular, bracket 20 can be mounted on the license plate, or even be incorporated into the license plate frame. This provides a substantial advantage in that it can be attached to the vehicle 2 without any alteration of bodywork. Also shown are video camera leads 21 which can be routed to an aftermarket monitor, or attached to a pre-existing vehicle display system.

Figure 7:
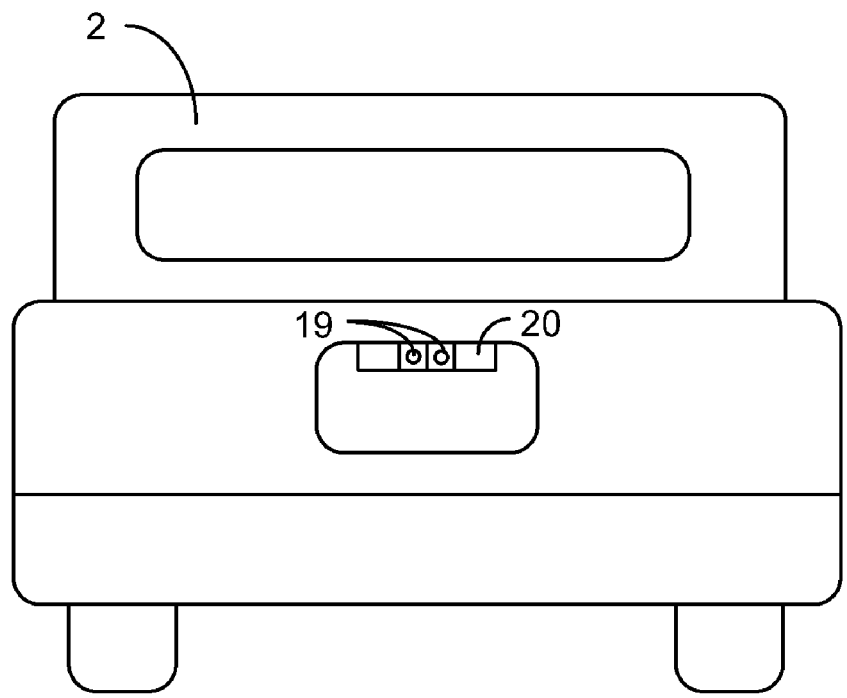
FIG. 7 illustrates a rear view of the alternative preferred embodiment of FIG. 6 in which the video system is mounted on the rear of the vehicle.

FIG. 7 illustrates a rear view of the alternative preferred embodiment of FIG. 6 in which the video system is mounted on the rear of vehicle 2. In particular, the same bolts used to secure the license plate can be used to secure the video system.

In this embodiment, video data from each camera 11 can be electronically stitched together using known techniques to create a single panoramic image.

In addition to the basic invention presented in the foregoing discussion, a further improvement provided by the invention includes known motion detection circuitry that analyzes the images detected by cameras 11 to determine if an object is moving near vehicle 2. If motion is detected, the system can automatically activate an optional audible alarm 18 to warn the driver.

Figure 8:
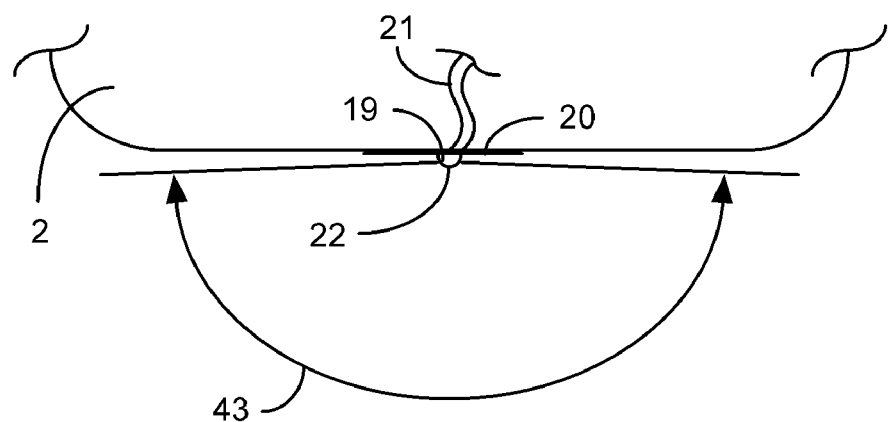
FIG. 8 illustrates a rear view of another alternative preferred embodiment in which the video system using a single wide-angle camera that is mounted on the rear of the vehicle.

Referring to FIG. 8, this figure illustrates another alternative embodiment in which a single wide-angle camera 22 is mounted on the rear of the vehicle 2. Cameras having approximately 170° fields of vision 43 are commercially available from a variety of sources. This provides a simpler and more aesthetically pleasing appearance to the vehicle 2. Of course, the use of multiple cameras as shown in FIG. 7 allows a full 180°, or better, view.

Figure 9:
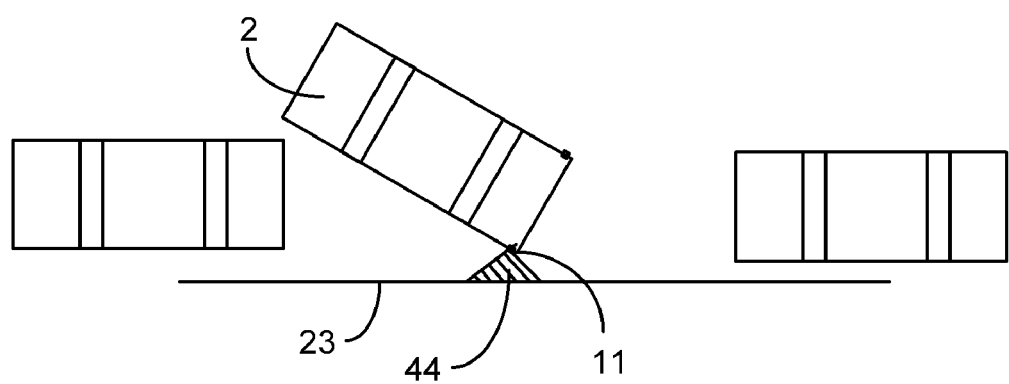
FIG. 9 illustrates another use of the invention for measuring distance to a curb when parking.

In regard to FIG. 9, this figure illustrates how the invention can be used to assist drivers when parking. In particular, the camera 11 can be used to assist a driver in judging how far vehicle 2 is from the curb 23. This figure illustrates the field of view 44 provided to the driver to estimate distance from the curb 23.

FIG. 10A Illustrates the driver's blind spots 24, 25 when vehicle 2 is traveling in direction 6 on a multi-lane road 8.

FIG. 10B illustrates unseen vehicles 26, 27 in the driver's blind spots 24, 25 when the driver's vehicle 2 is traveling in direction 6 on a multi-lane road 8. As is well known, presence of a vehicle 26 or 27 in the driver's blind spots 24 or 25 can present an extreme safety hazard when vehicle 2 is changing lanes.

An optional feature of this invention provides for automatic activation of left and right side vehicle monitoring whenever a vehicle turn signal is activated. In this preferred embodiment, activation of a left or right turn signal will automatically activate cameras for that side of the vehicle 2. The data from the side view camera is input to the monitor 12 that provides the driver with of view of anything within blind spots 24 or 25. In the preferred embodiment, the same monitoring system is used which was discussed above in regard to the other embodiments. However, those skilled in the art will recognize that the left and right side view mirrors can also be equipped with display screens so that the driver's habits will not change. For example, the driver would normally look at the left side view mirror when turning left or look at the right side view mirror when turning right. When a left or right turn signal is activated, the monitor for the left or right side view mirror would also be activated so that the driver would see anything in the blind spot. As a result, the possibility of collisions that occur during lane changes will be greatly reduced.

Figure 10C:
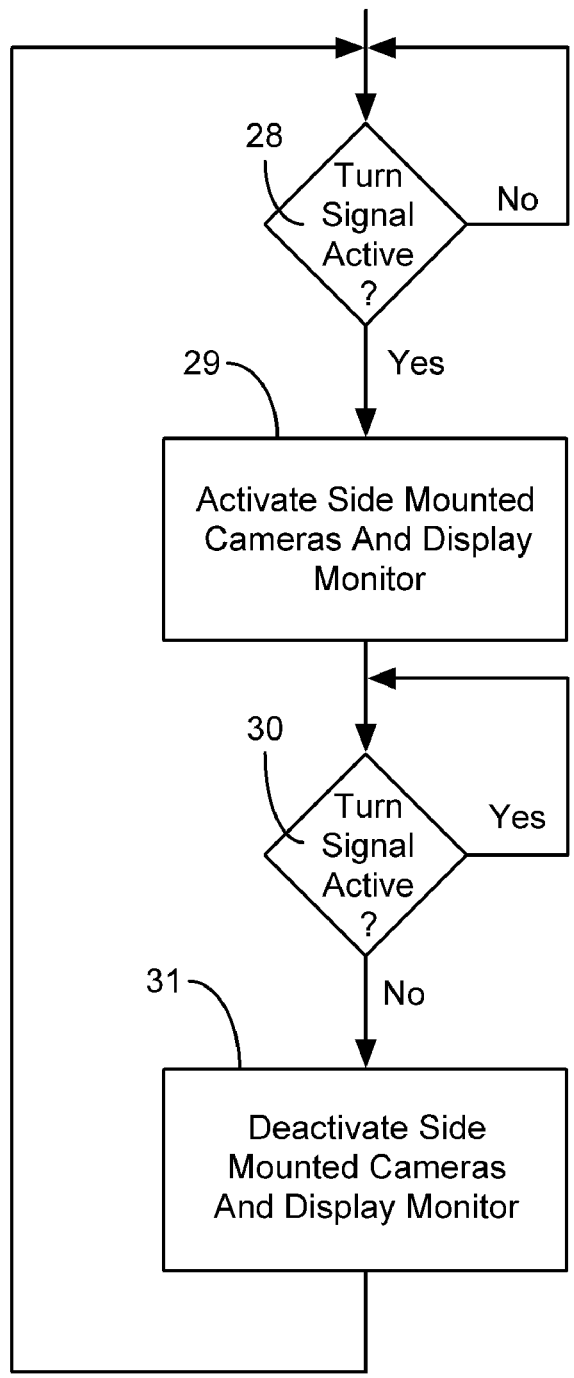
FIG. 10C is a flowchart that illustrates automatic activation of the side view monitor of the driver's blind spots when a turn signal is activated.

FIG. 10C is a flowchart that illustrates automatic activation of the side view cameras 11 to monitor the driver's blind spots 24, 25 when a turn signal is activated. The system is activated at step 27 when the driver activates a turn signal. The turn signal is used to activate the appropriate side camera 11 and begin feeding video information to the monitor 12. Per step 30, side camera 11 and monitor 12 will remain active as long as the turn signal as active. Once the turn signal is turned off, side camera 11 and monitor 12 are deactivated and the system returns to an inactive state.

An advantage associated with using a turn signal as the trigger for the warning system is that it requires no action on part of the driver when changing lanes. Blind spots are automatically displayed on the monitor 12 so long as driver has the turn signal on. This provides additional safety because the driver does not have to remember to take any action to activate the system.

Figure 10D:
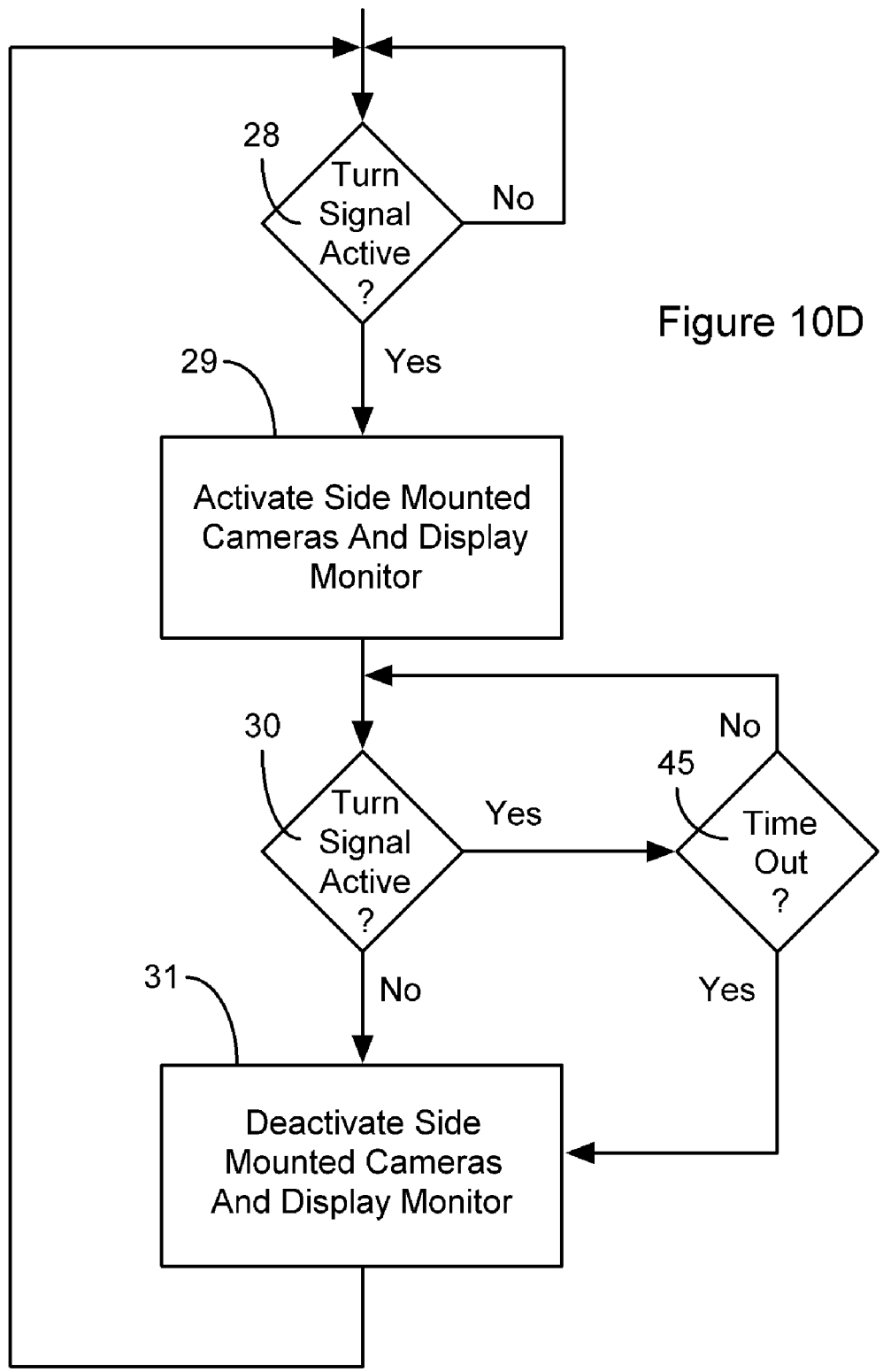
FIG. 10D is a flowchart that illustrates automatic activation of the side view monitor of the driver's blind spots when a turn signal is activated with an optional timer to deactivate the side view monitoring after the turn signal has been on for a predetermined period of time.

FIG. 10D is a flowchart that illustrates an alternative preferred embodiment in which automatic activation of the side view monitor of the driver's blind spots when a turn signal is activated is time limited. An optional timer deactivates the side view monitoring after the turn signal has been on for a predetermined period of time. The amount of time needed to activate the timeout can be any suitable mount of time, for example, 30-60 seconds. This addresses the situation wherein the turn signal is not automatically turned off after a lane change and the driver forgets to manually turn off the turn signal. This figure is the same as FIG. 10C with the addition of timeout step 45. When the turn signal is activated, the timer begins the timeout period. As soon as the timeout period is exceeded, the timer deactivates the monitor even if the turn signal is still active.

Figure 10E:
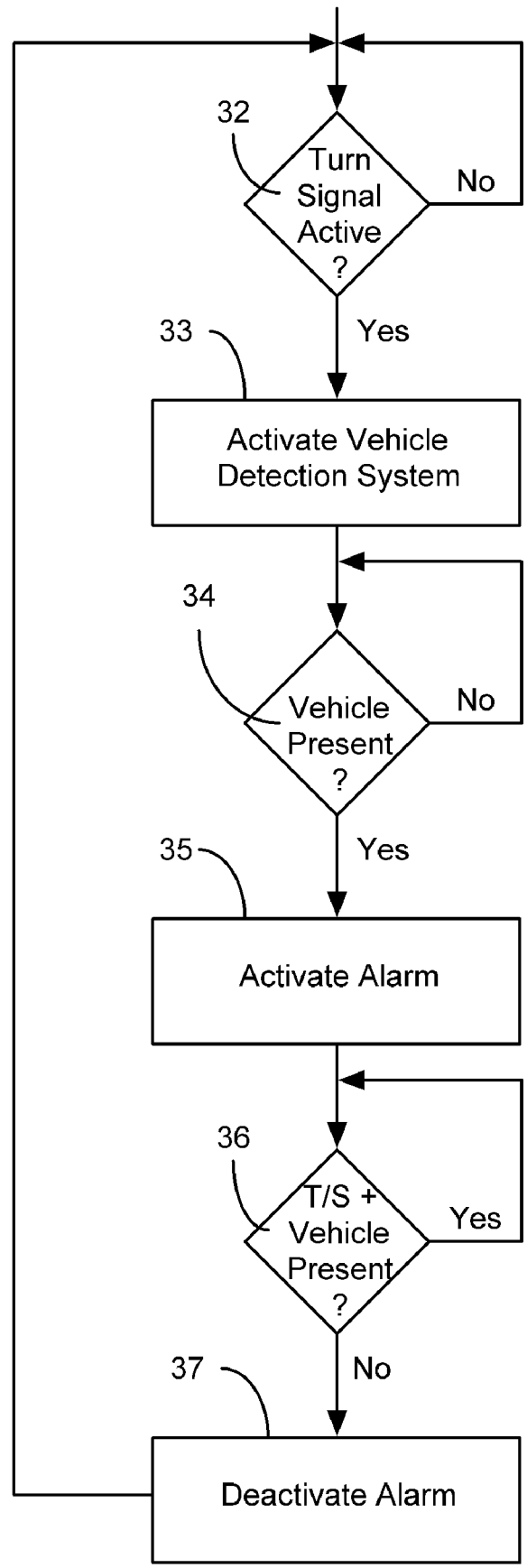
FIG. 10E is a flowchart that illustrates automatic activation of an alarm when a turn signal is activated and a vehicle or obstruction is present in the driver's blind spots.

FIG. 10E is a flowchart that illustrates automatic activation of an alarm when a turn signal is activated if a vehicle 26 or 27 or other obstruction is present in the driver's blind spots 24 or 25. This embodiment is directed to radar or sonar based detection systems. Similar to the previous embodiments, the system remains inactive until a turn signal is activated at step 32. At step 33, side mounted radar or sonar detectors are activated to monitor for objects in adjacent lanes. If a vehicle or other object is detected in step 34, then an alarm will be activated at step 35. The alarm can be anything suitable, such as an audible alarm, or a visual alarm such as a lamp. Per step 36, the alarm will remain on as long as the turn signal is active and an object is detected in the blind spot 24 or 25. Once the turn signal is turned off or the other vehicle 26 or 27 or other object is no longer detected, then the alarm is automatically turned off at step 37.

While the preferred embodiment uses a conventional video system, the invention can also use of other technologies. For example, night vision cameras can also be used to allow the system to work more efficiently at night. Likewise, the camera function does not have to work on visible light. It can use infrared, sonar or radar technology to detect oncoming vehicles. In addition, the monitor 12 can be replaced or augmented with an audio alarm 18.

While specific embodiments have been discussed to illustrate the invention, it will be understood by those skilled in the art that variations in the embodiments can be made without departing from the spirit of the invention. For example, the cameras can communicate wirelessly with the display instead of using conventional hardwiring, etc. Therefore, the invention shall be solely limited to the scope of the claims.

We claim:

1. A visual safety system for a vehicle, comprising:
   a vehicle having a front end, a rear end, a first side and a second side;
   at least a first and a second camera mounted substantially at or near the rear end of the vehicle, the first camera positioned such that it faces traffic approaching the right side of the vehicle substantially perpendicular to the longitudinal length of the vehicle, and the second camera positioned such that it views faces traffic approaching the left side of the vehicle substantially perpendicular to the longitudinal length of the vehicle;
   the first and second cameras outputting video data to a monitor;
   the monitor mounted inside a vehicle in a position which allows it to be viewed by the driver;

means to detect when the vehicle is placed in reverse gear; and control means to automatically activate the first and second cameras and the monitor when the vehicle is in reverse gear;

the monitor having a video data input to receive video data from the first and second cameras and display areas for displaying the video data such that, when backing out the vehicle from a parking space, vehicular traffic approaching the vehicle in a substantially perpendicular direction from the left and/or right side is displayed on the monitor prior to it bein visible via direct line of sight by the driver such that the driver can brake the vehicle prior to having direct visual observation of the oncoming traffic;

whereby the vehicle driver is automatically presented with video information about oncoming traffic when the vehicle is in reverse such that a driver can avoid collisions with oncoming traffic when backing out of a parking place by having visual information not directly available by direct observation by the driver.

2. A system, as in claim 1, wherein:
the first and second cameras are mounted on the side of the vehicle.

3. A system, as in claim 2, wherein:
the first and second cameras are incorporated into the bodywork of the vehicle.

4. A system, as in claim 3, wherein:
the monitor is an add-on monitor.

5. A system, as in claim 3 wherein:
the monitor is a pre-existing monitor incorporated into the dashboard of the vehicle.

6. A system, as in claim 2, wherein:
the first and second cameras are incorporated into the rear lamp covers.

7. A system, as in claim 6, wherein:
the monitor is an add on monitor.

8. A system, as in claim 6, wherein:
the monitor is a pre-existing monitor incorporated into the dashboard of the vehicle.

9. A system, as in claim 1, wherein:
the first and second cameras are mounted on the rear of the vehicle.

10. A system, as in claim 9, wherein:
the first and second cameras are incorporated into a bracket attached to the vehicle.

11. A system, as in claim 10, wherein:
the monitor is an add-on monitor.

12. A system, as in claim 10, wherein:
the monitor is a pre-existing monitor incorporated into the dashboard of the vehicle.

13. A system, as in claim 9, wherein:
the first and second cameras are incorporated into the license frame of the vehicle.

14. A system, as in claim 13, wherein:
the monitor is an add-on monitor.

15. A system, as in claim 13, wherein:
the monitor is a pre-existing monitor incorporated into the dashboard of the vehicle.

16. A system, as in claim 1, wherein:
the first and second cameras are night vision cameras.

* * * * *